United States Patent
Yang et al.

(10) Patent No.: US 12,299,974 B2
(45) Date of Patent: May 13, 2025

(54) TRANSMISSION LINE DEFECT IDENTIFICATION METHOD BASED ON SALIENCY MAP AND SEMANTIC-EMBEDDED FEATURE PYRAMID

(71) Applicant: ZHEJIANG UNIVERSITY, Hangzhou (CN)

(72) Inventors: Qiang Yang, Hangzhou (CN); Chao Su, Hangzhou (CN); Yuan Cao, Hangzhou (CN); Di Jiang, Hangzhou (CN); Hao Xu, Hangzhou (CN); Kaidi Qiu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 405 days.

(21) Appl. No.: 18/081,368

(22) Filed: Dec. 14, 2022

(65) Prior Publication Data
US 2023/0360390 A1    Nov. 9, 2023

(51) Int. Cl.
| | |
|---|---|
| G06V 20/10 | (2022.01) |
| G06T 3/4053 | (2024.01) |
| G06T 5/20 | (2006.01) |
| G06V 10/46 | (2022.01) |
| G06V 10/764 | (2022.01) |

(Continued)

(52) U.S. Cl.
CPC .......... *G06V 20/176* (2022.01); *G06T 3/4053* (2013.01); *G06T 5/20* (2013.01); *G06V 10/464* (2022.01); *G06V 10/764* (2022.01); *G06V 10/7715* (2022.01); *G06V 10/774* (2022.01);

(Continued)

(58) Field of Classification Search
CPC .. G06V 20/176; G06V 10/464; G06V 10/764; G06V 10/7715; G06V 10/774; G06V 10/52; G06V 20/70; G06V 10/454; G06V 10/82; G06V 10/25; G06V 10/806; G06T 3/4053; G06T 5/20; G06T 2207/20016; G06T 2207/20081; G06T 2207/20084; G06T 7/0004; G06T 3/4046;
(Continued)

(56) References Cited

U.S. PATENT DOCUMENTS

2019/0385057 A1* 12/2019 Litichever .............. H04L 63/14

FOREIGN PATENT DOCUMENTS

| CN | 108876788 A | * 11/2018 | .......... G06K 9/6221 |
| CN | 109145905 A | * 1/2019 | |

(Continued)

*Primary Examiner* — Samir A Ahmed
(74) *Attorney, Agent, or Firm* — NOD Law PC (57) ABSTRACT

The present disclosure provides a transmission line defect identification method based on a saliency map and a semantic-embedded feature pyramid, including the following steps: step 1: cleaning and classifying a dataset; step 2: generating a super-resolution image for a small target of a transmission line by using an Electric Line-Enhanced Super-Resolution Generative Adversarial Network (EL-ESRGAN) model; step 3: performing image saliency detection on the dataset by constructing a $U^2$-Net; step 4: performing data augmentation on the dataset by using GridMask and random cutout algorithms based on a saliency map, and generating a classified dataset; and step 5: performing image classification on a normal set and a defect set by using a ResNet34 classification algorithm and a deep semantic embedding (DSE)-based feature pyramid classification network.

4 Claims, 11 Drawing Sheets

(51) Int. Cl.
*G06V 10/77* (2022.01)
*G06V 10/774* (2022.01)

(52) U.S. Cl.
CPC ............... *G06T 2207/20016* (2013.01); *G06T 2207/20081* (2013.01)

(58) Field of Classification Search
CPC .......... G06T 2207/20104; Y04S 10/50; G06N 3/045; G06N 3/08
See application file for complete search history.

(56) References Cited

FOREIGN PATENT DOCUMENTS

| | | | | |
|---|---|---|---|---|
| CN | 109215020 A | * | 1/2019 | ......... G01N 21/8851 |
| CN | 109559310 A | * | 4/2019 | ........... G06N 3/0454 |
| CN | 111524135 A | * | 8/2020 | ......... G01N 21/8851 |
| CN | 114170535 A | * | 3/2022 | |

* cited by examiner

Original image / Generative adversarial image magnified by four times

FIG. 11

TRANSMISSION LINE DEFECT IDENTIFICATION METHOD BASED ON SALIENCY MAP AND SEMANTIC-EMBEDDED FEATURE PYRAMID

CROSS REFERENCE TO RELATED APPLICATION

This patent application claims the benefit and priority of Chinese Patent Application No. 202210506022.X, filed with the China National Intellectual Property Administration on May 9, 2022, the disclosure of which is incorporated by reference herein in its entirety as part of the present application.

TECHNICAL FIELD

The present disclosure relates to image processing in transmission line inspection, and in particular, to a transmission line defect identification method based on a saliency map and a semantic-embedded feature pyramid.

BACKGROUND

In industrial practice, a common method for identifying a defect of a transmission line quickly and economically is to use an image classification model to classify an image output after target detection performed on the transmission line, so as to determine whether a component is faulty. However, in practice, most of target images of the transmission line are non-defective images, and cannot be used to train a supervised learning model for defect identification and analysis. Such an imbalance between defective and non-defective samples is referred to as a long tail effect. In order to resolve this problem, data levels can be augmented, and resampling can be performed to generate a new sample for a category with insufficient samples. This method will lead to oversampling of a few samples, thereby causing model overfitting and directly lowering performance of a feature extraction model.

To resolve a defect identification problem of the transmission line, the present disclosure provides a transmission line defect identification method based on a saliency map and a semantic-embedded feature pyramid. Innovation and technological contributions of this method are mainly reflected in the following aspects:

(1) A super-resolution generative adversarial network (SRGAN) is introduced to perform data augmentation and semantic information expansion on a small target of the transmission line, which resolves problems that the small target of the transmission line has an unclear boundary and insufficient semantic information.

(2) A saliency map is introduced to label a saliency of an image, and a non-salient feature is guided to be cut out, so as to retain a defect feature to a maximum extent and obtain more augmented defect data, thereby resolving a problem that it is difficult for a classification model to learn the defect feature because a random cutout algorithm cuts out a salient feature in a defect image.

(3) Compared with an existing defect identification model, the present disclosure constructs a deep semantic embedding (DSE)-based enhanced feature pyramid classification network, and classifies and trains a normal dataset and a defect dataset of a target object of the transmission line, which better meets real-time and accuracy requirements of actual defect identification.

Experimental results show that the model proposed in the present disclosure has high accuracy, strong robustness, and a high defect recall ratio, and can better resolve the defect identification problem of the transmission line.

SUMMARY

The present disclosure is intended to provide a transmission line defect identification method based on a saliency map and a semantic-embedded feature pyramid. The method generates a super-resolution image for a small target of a transmission line by using an Electric Line-Enhanced Super-Resolution Generative Adversarial Network (EL-ESRGAN) model, performs image saliency detection on a defect dataset based on a saliency map by constructing a nested U-shaped network, performs data augmentation on the defect dataset based on the saliency map by using GridMask and random cutout algorithms, and performs defect identification on a target image of the transmission line based on a ResNet34 classification algorithm by constructing a DSE-based feature pyramid classification network.

The present disclosure provides a transmission line defect identification method based on a saliency map and a semantic-embedded feature pyramid, including the following steps:

1) taking a target image of a transmission line as a dataset, labeling, based on whether the transmission line has a defect, the dataset as a normal set or a defect set, and classifying the dataset as a small target set or a non-small target set based on a size of the target image and a given threshold;

2) performing image super-resolution expansion on the small target set by using an EL-ESRGAN algorithm, combining the non-small target set and a small target set obtained after image super-resolution expansion, compressing a combined set based on a size of the small target set, and dividing the combined set into a training set and a test set;

3) generating a saliency map of an image in the training set by using a nested saliency detection network (hereinafter referred to as $U^2$-Net), ensuring integrity of a key region of a detection target by using a morphological expansion algorithm, generating a cutout region randomly for a part whose saliency score is less than a threshold, and padding a pixel randomly to form a data-augmented image set;

4) inputting a data-augmented image and its label into a DSE-based feature pyramid classification network to perform training to obtain a trained classifier: and 5) obtaining image data of an inspected target of the transmission line in real time, and taking the image data as an input of the trained classifier to output an identification result.

As an optional implementation solution of the present solution, the performing image super-resolution expansion by using an EL-ESRGAN algorithm in the step 2) specifically includes:

2.1) defining loss functions of a generator and a discriminator of an EL-ESRGAN model, where formulas of the loss functions are as follows:

$$L_G^{Ra} = -E_{x_r}[\log(1-D_{Ra}(x_r,x_f))] - E_{x_f}[\log(D_{Ra}(x_f,x_r))]$$

$$L_D^{Ra} = -E_{x_r}[\log(D_{Ra}(x_r,x_f))] - E_{x_f}[\log(1-D_{Ra}(x_f,x_r))]$$

where $L_G^{Ra}$ represents the GAN loss function of the generator, $L_D^{Ra}$ represents the GAN loss function of the discriminator, $D_{Ra}(x_r,x_f)$ represents a probability that an authenticated image is more real than a false image, $D_{Ra}(x_f, x_r)$ represents a probability that the authenticated image is falser than a real image, $E_x[\ ]$ represents an averaging operation performed on all false data in a processing batch, $x_i$ represents a low-resolution image input into a GAN, $x_f$ represents an authenticated image that is generated by the GAN and determined to be false, and $x_r$ represents an authenticated image that is generated by the GAN and determined to be real;

2.2) training the generator of the EL-ESRGAN model by using the non-small target set of the transmission line to obtain a second-order degradation model, and using an L1 loss function, a perceptual loss function, and the GAN loss functions represented by $L_G^{Ra}$ and $L_D^{Ra}$ together to construct an overall loss function of an EL-ESRGAN, and performing training to obtain the EL-ESRGAN model, and 2.3) performing image super-resolution augmentation on the small target set of the transmission line by using the trained EL-ESRGAN model.

As an optional implementation solution of the present disclosure, the step 3) specifically includes:

3.1) building a residual U-block (RSU) network based on a residual block network structure;

3.2) building, by stacking the RSU network described in 3.1), the $U^2$-Net composed of 11 stages;

3.3) generating a saliency score of the target image of the transmission line by using the $U^2$-Net, ensuring the integrity of the key region of a detection target by using the morphological expansion algorithm, and generating an image mask region; and 3.4) randomly selecting GridMask and random cutout algorithms to perform a cutout operation randomly in the image mask region, and padding the pixel randomly.

As an optional implementation solution of the present disclosure, the DSE-based feature pyramid classification network used in the step 4) includes:

a residual network (ResNet) feature extraction module, where an input of the ResNet feature extraction module is the target image of the transmission line, and an output of the ResNet feature extraction module is features of different scales of the image;

an enhanced feature pyramid network (EFPN) module, where an input of the EFPN module is the features of different scales that are generated by the ResNet feature extraction module, and an output of the EFPN module is a feature obtained by fusing features of adjacent scales;

a DSE module, where an input of the DSE module is the fused feature generated by the EFPN module, and an output of the DSE module is a low-resolution feature with rich semantic information and a high-resolution feature with rich position information;

a deep feature fusion (DFF) module, where an input of the DFF module is the low-resolution feature and the high-resolution feature that are generated by the DSE module, and an output of the DFF module is a feature vector obtained by performing convolution and pooling operations on the high-resolution and low-resolution features; and an image object classification network (OC), where an input of the image object classification network (OC) is the feature vector that is generated by the DFF module for the high-resolution feature and the low-resolution feature, and an output of the image object classification network (OC) is a classification result indicating whether the inspected target of the transmission line is faulty.

As an optional implementation solution of the present disclosure, the dataset used in the step 1) is an insulator self-explosion dataset of the transmission line.

According to a specific implementation solution of the present disclosure, the DSE-based feature pyramid classification network is obtained through training by using an insulator image training set, of the transmission line, constructed in the step 2), an insulator image test set, of the transmission line, constructed in the step 2) is used to test the classification network, and network classification accuracy and an F2-Score are used as evaluation indicators of a classification effect.

In an embodiment of the present disclosure, the step 5) specifically includes:

(a) obtaining an insulator image in an inspection image of the transmission line, (b) inputting a tailored image into the DSE-based feature pyramid classification network; and (c) outputting, by the DSE-based feature pyramid classification network, a result indicating whether there is a defect in an insulator.

Compared with the prior art, the present disclosure has the following beneficial effects:

(1) The present disclosure adopts an EL-ESRGAN algorithm to overcome problems of missing information of a small target, unbalanced classification of positive and negative samples, and insufficient defective targets in the prior art, thereby enhancing an image definition of a small target dataset of a transmission line and interpretability of an instance, and providing a training scheme for data augmentation of the small target under a complex and extreme background.

(2) The present disclosure performs image saliency detection based on a nested U-shaped network to guide adaptive defect data enhancement, which overcomes classification feature masking that may be caused by a traditional data augmentation method, and saves a lot of labeling workload of pixel-level semantic segmentation, thereby extracting a region of interest (ROI) of a target object of the transmission line and randomly occluding a background target.

(3) The present disclosure adopts a DSE-based enhanced feature pyramid classification network, which overcomes problems of poor fusion of a global image-level feature and a local target-level feature in a conventional target classification network and failure to identify a defect target with a high-spatial complexity image and a large intra-class morphological difference change in the transmission line, thereby effectively improving a capability of identifying a defect of the transmission line and perceptual robustness, and providing a feasible implementation path for intelligent defect identification of the transmission line.

BRIEF DESCRIPTION OF THE DRAWINGS

In order to describe the technical solutions in the embodiments of the present disclosure more clearly, the accompanying drawings required for describing the embodiments are briefly described below. Obviously, the accompanying drawings in the following description show merely some embodiments of the present disclosure, and a person of ordinary skill in the art can further derive other accompanying drawings from these accompanying drawings without creative efforts.

FIG. 1 is a flowchart of a method according to the present disclosure.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art on the basis of the embodiments of the present disclosure without creative efforts shall fall within the protection scope of the present disclosure.

Figure 1:
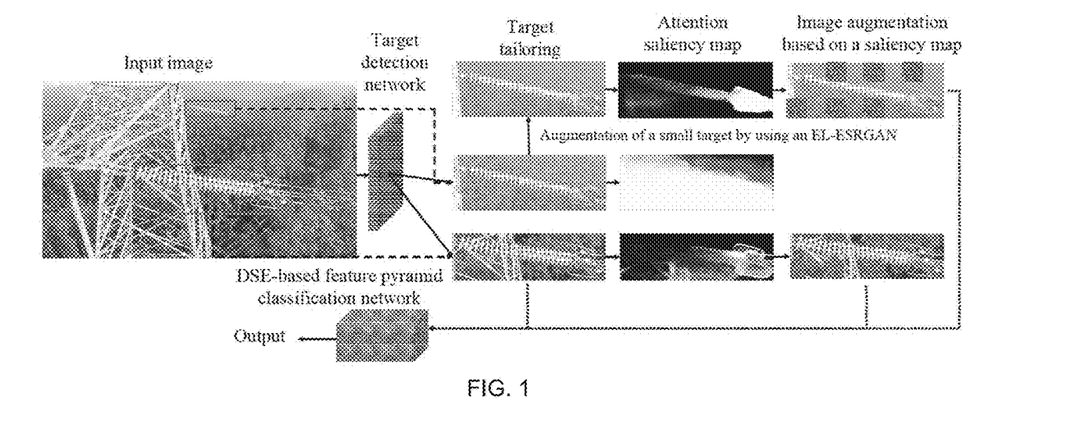

As shown in FIG. 1, to resolve data augmentation and image classification problems in defect identification of a transmission line, the present disclosure provides an identification method for a small defect of a transmission line. The identification method includes the following steps:

1) Take a target image of a transmission line as a dataset, label, based on whether the transmission line has a defect, the dataset as a normal set or a defect set, and classify the dataset as a small target set or a non-small target set based on a size of the target image and a given threshold.

2) Perform image super-resolution expansion on the small target set by using an EL-ESRGAN algorithm, combine the non-small target set and a small target set obtained after image super-resolution expansion, compress a combined set based on a size of the small target set, and divide the combined set into a training set and a test set.

3) Generate a saliency map of an image in the training set by a $U^2$-Net, ensure integrity of a key region of a detection target by using a morphological expansion algorithm, generate a cutout region randomly for a part whose saliency score is less than a threshold, and pad a pixel randomly to form a data-augmented image set.

4) Input a data-augmented image and its label into a DSE-based feature pyramid classification network to perform training to obtain a trained classifier.

5) Obtain image data of an inspected target of the transmission line in real time, and take the image data as an input of the trained classifier to output an identification result.

Figure 2:
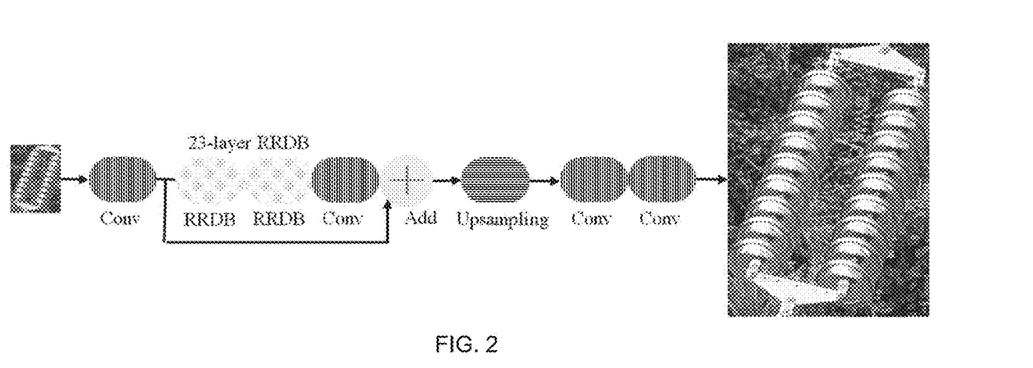
FIG. 2 is a main structural diagram of a generator G in an EL-ESRGAN.
Figure 3:
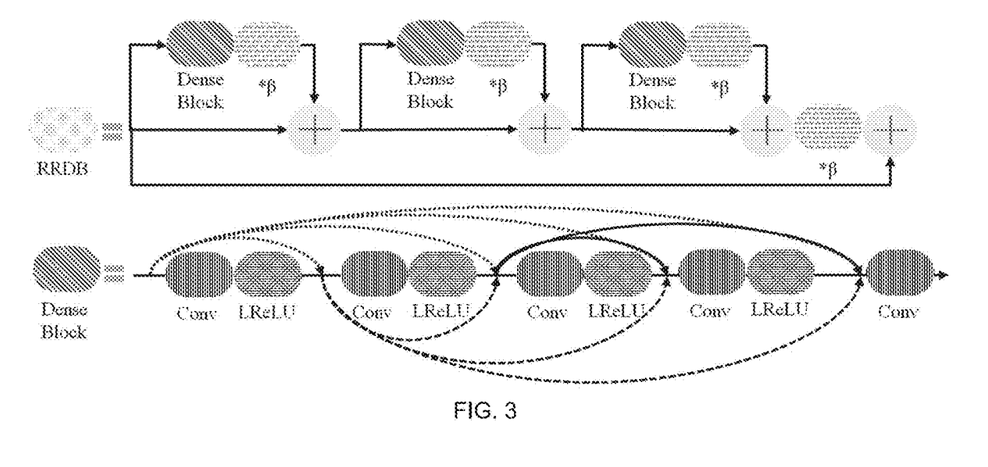
FIG. 3 is a structural diagram of a densely connected residual-in-residual dense block (RRDB) of a generator G in an EL-ESRGAN.
Figure 4:
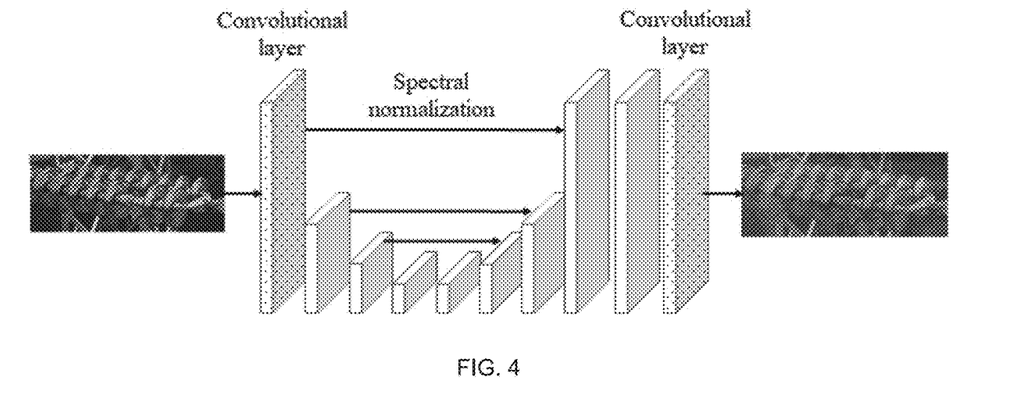
FIG. 4 is a structural diagram of a U-Net structure discriminator D with spectral normalization in an EL-ESRGAN.

In the step 2), a main structure of a generator G in an EL-ESRGAN is shown in FIG. 2. A densely connected RRDB is used as a basic network block, and its structure is shown in FIG. 3. A discriminator D in the EL-ESRGAN uses a U-Net structure with spectral normalization, and its structure is shown in FIG. 4. A U-Net network design with a skip connection can generate an accurate gradient feedback, output a real value of each pixel, and provide a detailed pixel feedback for the generator. However, the U-Net network structure and a complex degradation process also greatly increase instability of training. Therefore, spectral normalization is introduced to stabilize a training state, help to alleviate hyperacuity and an artifact that are brought by GAN training, and achieve a good balance between local detail enhancement and artifact suppression.

Figure 5:
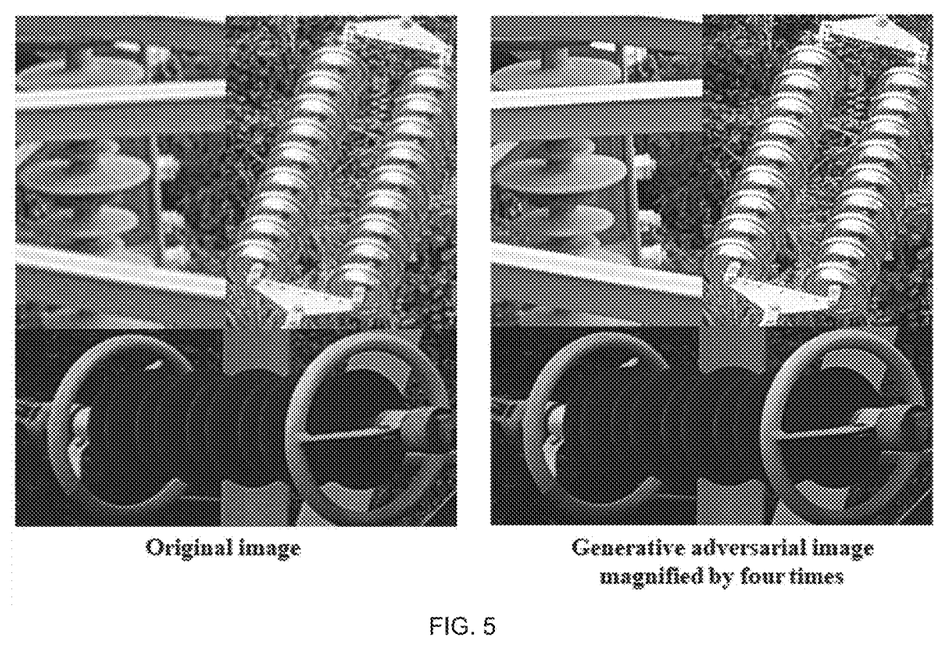
FIG. 5 shows an effect of magnifying an insulator image of a transmission line by an EL-ESRGAN.

As shown in FIG. 5, by comparing an original image with a generative adversarial image, it is found that the EL-ESRGAN algorithm constructed in the step 2) can perform effective pixel expansion and semantic information augmentation on different types of low-resolution targets of the transmission line.

Figure 7:
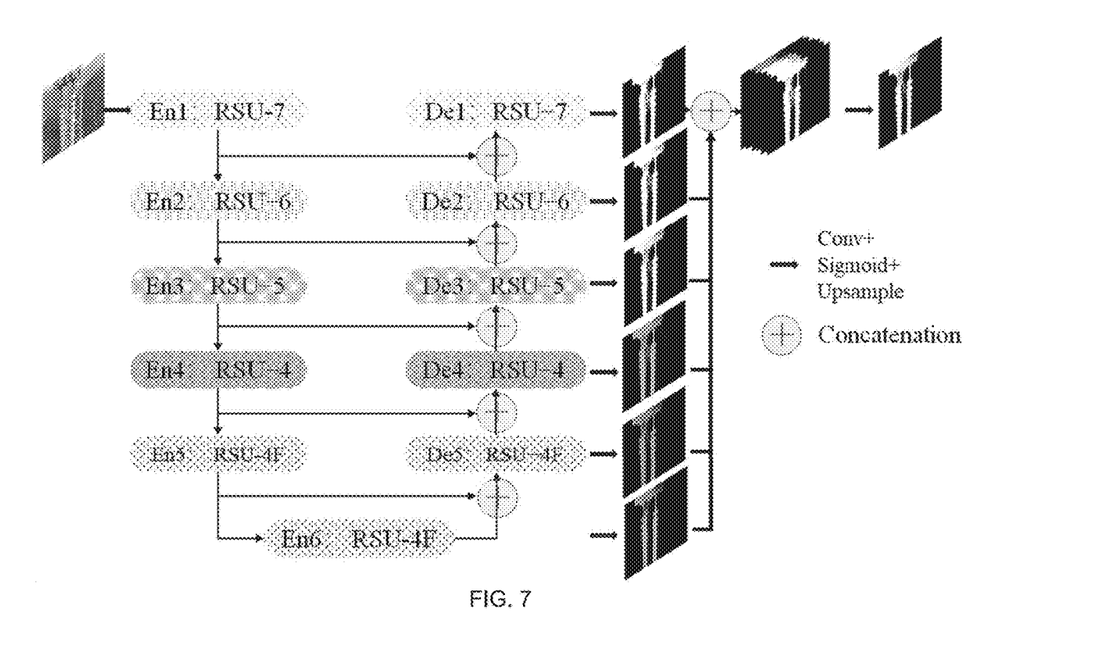
FIG. 7 is a structural diagram of a $U^2$-Net.

In the step 3), the $U^2$-Net is used to generate the saliency map of the image. A structure of the $U^2$-Net is shown in FIG. 7. The structure is a U-shaped structure composed of 11 stages, and each of the stages is configured with an RSU network. The RSU network is responsible for extracting a multi-scale feature in a feature layer, while the large U-shaped structure is responsible for aggregating multi-level features between feature layers.

Figure 6:
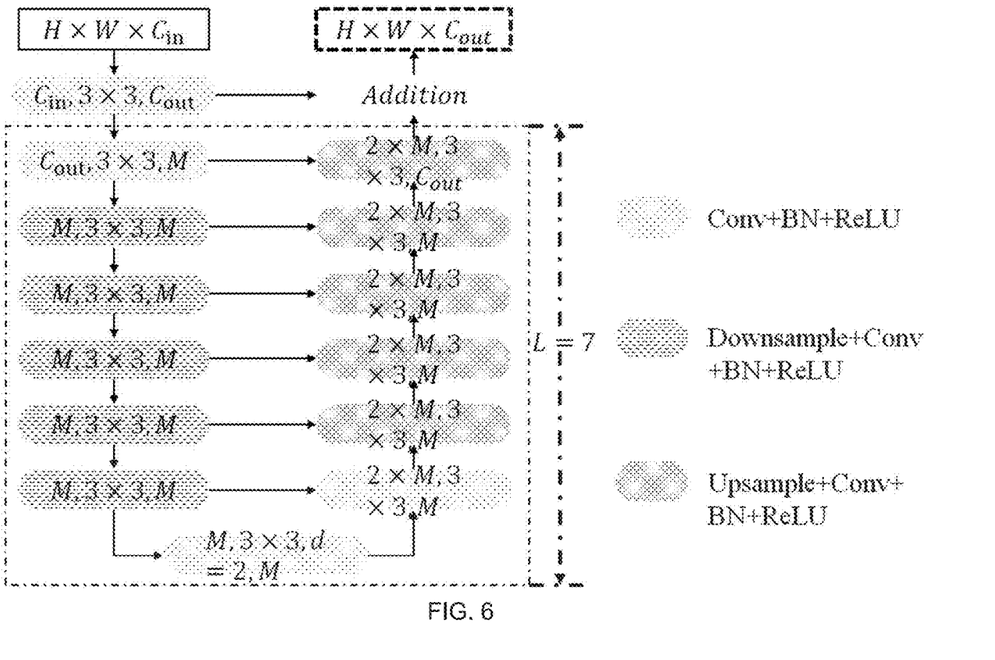
FIG. 6 is a structural diagram of a RSU network in a nested U-shaped network.

A structure of the RSU network is shown in FIG. 6, where L represents a quantity of encoder layers (7 by default). $C_{in}$ and $C_{out}$ respectively represent quantities of channels of an input feature map and an output feature map, and M represents a quantity of channels in a hidden layer. In an input convolution layer, the input feature map is converted into an intermediate feature map with a quantity of channels being $C_{out}$ for local feature extraction. The intermediate feature map is input into a U-shaped symmetric codec to learn, extract, and encode multi-scale context information. The multi-scale feature is extracted by using a downsampled feature map, and a high-resolution feature map is generated through progressive upsampling, tensor addition, and convolution operations, which reduces a detail loss caused by large-scale direct upsampling to a certain extent. In addition, a residual connection between a local feature and the multi-scale feature is realized by means of tensor addition.

In FIG. 7, encoders En1 to En4 use four RSU networks of different heights, namely, RSU-7, RSU-6, RSU-5, and RSU-4, to capture information of the high-resolution feature map. If encoders En5 and En6 continue to perform downsampling, context information will be lost due to a low resolution of the feature map. Therefore, pooling and upsampling operations in the RSU network are replaced by a dilated convolution operation to achieve resolution consistency between each feature map and the input feature map, and a corresponding structure is named RSU-4F. In each decoder De stage, an upsampled feature map in a previous stage and a feature map from the symmetric encoder are used as an input of the decoder after tensor splicing. A decoder in each layer separates an intermediate layer by using one convolutional layer with a 3×3 convolution kernel and one Sigmoid function. After the intermediate layer is expanded to a size of an input image through upsampling, tensor splicing is performed on six intermediate layers to generate a final saliency map by using one convolutional layer with a 3×3 convolution kernel and one Sigmoid function.

In the step 3), the saliency map of the U²-Net is used to guide image augmentation. A corresponding algorithm is implemented according to the following steps:

a) Take the target image img and a saliency grayscale map generated by the U²-Net as an input of the algorithm.

b) Calculate a median grayscale value θ in a grayscale and a saliency value grayscale$_{ij}$ of a pixel (i, j) in the grayscale map, and calculate, according to a formula binary={grayscale$_{ij}$≥θ}i∈width, j∈height, whether an identified target is available.

c) Perform two morphological expansion calculations S=(binary⊕B)⊕B, on the identified target, where B represents a 5×5 structural element in an expanded protection region, and ⊕ represents a symbol of the morphological expansion calculation.

d) Randomly select GridMask and random cutout algorithms: and for a non-empty mask set, if the GridMask algorithm is selected, randomly select a grid number d of the GridMask algorithm and an information retention ratio $r_g$ in a grid, and generate the mask set; or if the random cutout algorithm is selected, randomly select a region ratio s of a cutout region to be randomly cut out and an aspect ratio $r_c$ of the cutout region, and generate the mask set.

e) Cut out pixel information of the mask set in the original image, and randomly pad the pixel to obtain the data-augmented image img.

Figure 8:
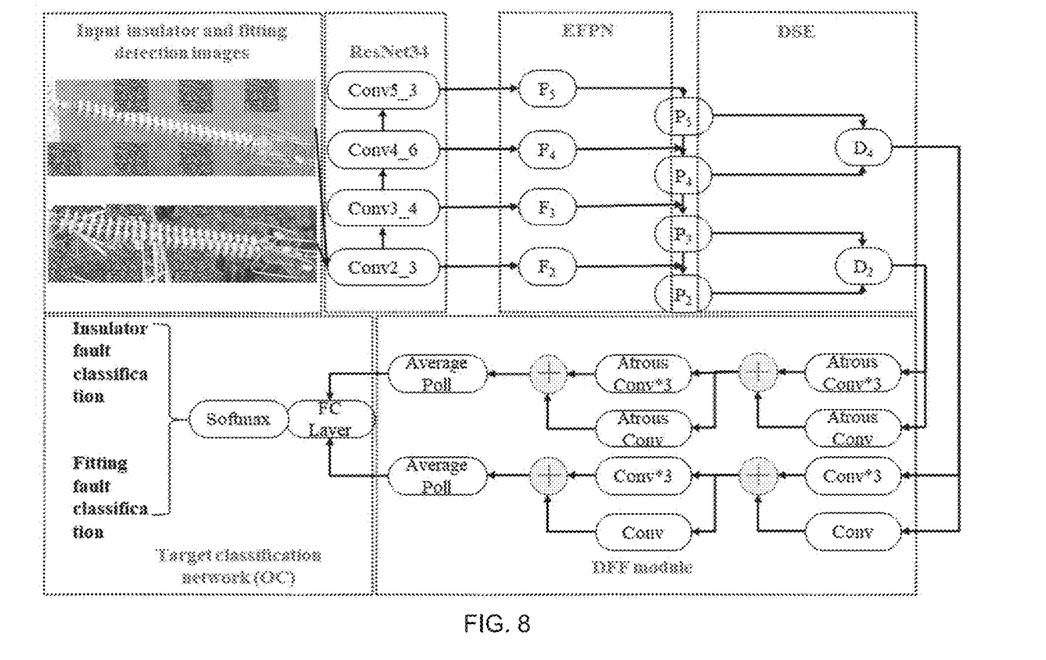
FIG. 8 is a structural diagram of a DSE-based enhancement feature pyramid classification network.
Figure 9:
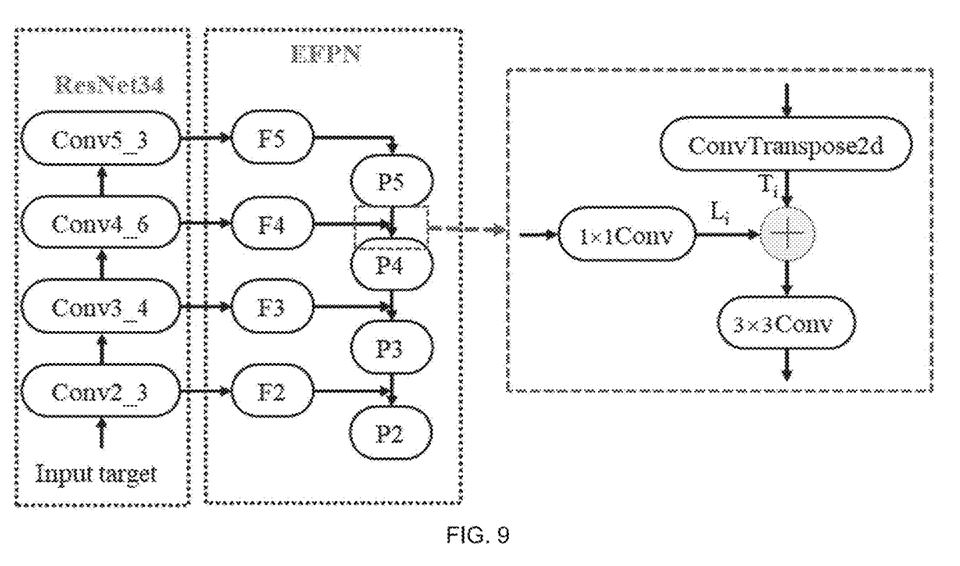
FIG. 9 is a structural diagram of an EFPN of a DSE-based enhanced feature pyramid classification network.
Figure 10:
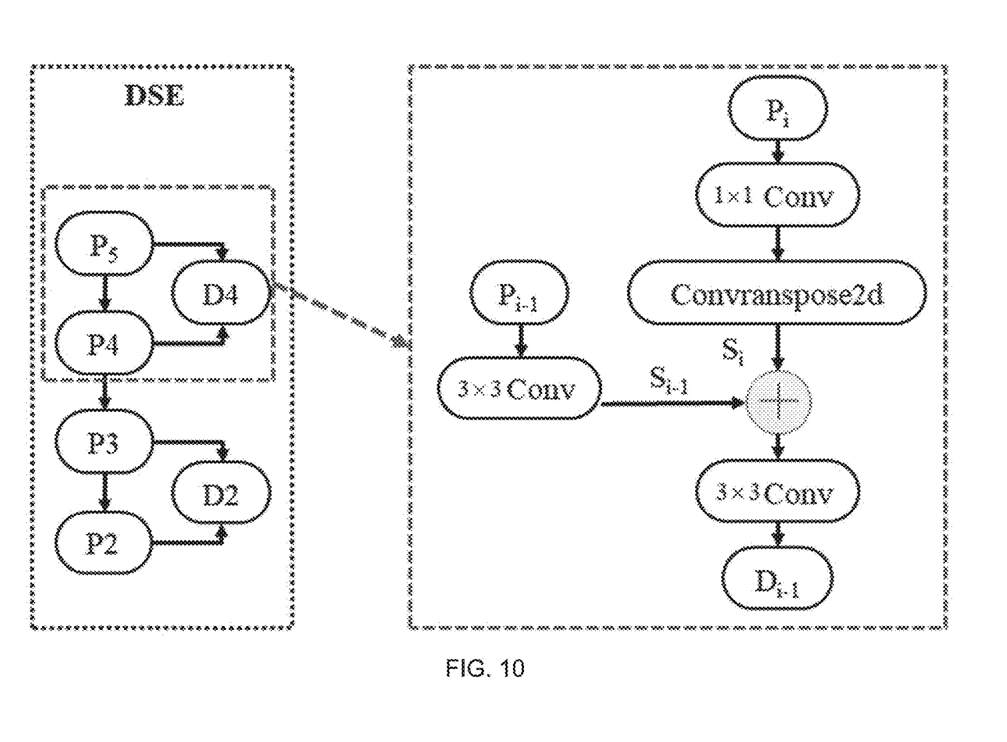
FIG. 10 is a structural diagram of a DSE module of a DSE-based enhanced feature pyramid classification network.

In the step 4), the DSE-based enhanced feature pyramid classification network is shown in FIG. 8. A ResNet34 is used as a residual network for image feature collection and transmission. An EFPN module is shown in FIG. 9, which is configured to generate a multi-level and multi-scale initial feature map. A DSE module is shown in FIG. 10, which is configured to generate a feature with rich semantics and a high spatial resolution. A DFF module is configured to process high-resolution and low-resolution features. An image object classification network (OC) is configured to classify a defect of the inspected target of the transmission line.

In the DFF module, feature processing of a high-level feature map is completed by two residual blocks and a bypass connection. A configuration of the residual block is shown in Table 1. After convolution, each layer is connected to one batch normalization layer and one ReLU activation layer of nonlinear transformation.

TABLE 1

| Residual block | Layer No. | Convolution kernel size | Pixel padded at an edge | Quantity of input channels | Quantity of output channels |
|---|---|---|---|---|---|
| Main channel | Conv1 | 1 × 1 | 0 | 256 | 64 |
| | Conv2 | 3 × 3 | 1 | 64 | 64 |
| | Conv3 | 3 × 3 | 1 | 64 | 256 |
| Bypass channel | Conv4 | 1 × 1 | 0 | 256 | 256 |

Feature processing of a low-level feature map has a similar structure to that of the high-level feature map, except that an atrous convolution residual block instead of the original residual block is used. A configuration of the atrous convolution residual block is shown in Table 2. After convolution, each layer is connected to one batch normalization layer and one ReLU activation layer of nonlinear transformation.

TABLE 2

| Atrous convolution Residual block | Layer No. | Convolution kernel size | Dilation rate | Quantity of input channels | Quantity of output channels |
|---|---|---|---|---|---|
| Main channel | Atrous-Conv1 | 1 × 1 | 1 | 256 | 64 |
| | Atrous-Conv2 | 3 × 3 | 3 | 64 | 64 |
| | Atrous-Conv3 | 3 × 3 | 5 | 64 | 256 |
| Bypass channel | Atrous-Conv4 | 1 × 1 | 1 | 256 | 256 |

Figure 11:
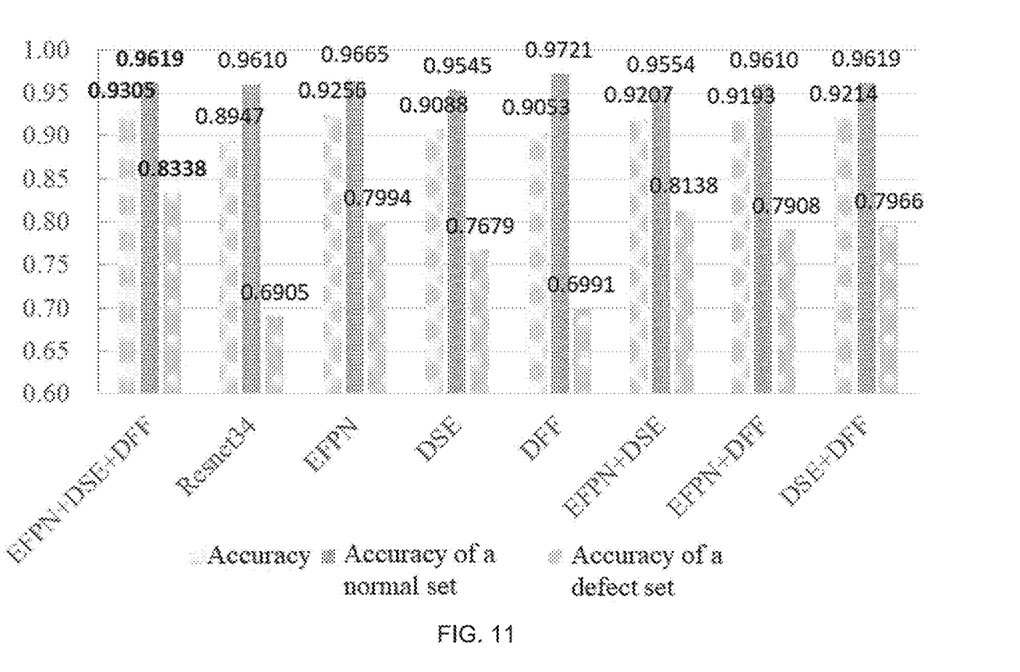
FIG. 11 compares accuracy of network models in a defect elimination experiment of a DSE-based enhanced feature pyramid classification network.

The ResNet34 is taken as a benchmark to carry out a defect elimination experiment for each module in the present disclosure. Experimental results are shown in FIG. 11. Overall classification accuracy of the network structure proposed in the present disclosure is 3.44% higher than that of the ResNet34, and the network structure proposed in the present disclosure improves accuracy of the defect set by 14.33%. Classification of the defect set is significantly improved. In addition, it can be found by comparing the defect elimination experiments that a combination of the EFPN, DSE, and DFF modules proposed in the present disclosure is better than other models in classification tasks. Among the three modules, the EFPN module has a most prominent effect on improving model accuracy. It provides sufficient information for target classification and feature fusion by strengthening semantics of feature maps at all levels.

In defect identification of the transmission line, it is necessary to improve a recall rate on a premise of ensuring accuracy, so as to find faults as much as possible and reduce potential risks to transmission safety. Therefore, an F-Score is introduced as an evaluation indicator of measuring the accuracy and the recall rate, and is defined as follows:

$$F_\beta\text{-Score} = (1 + \beta^2) \cdot \frac{\text{Precision} \cdot \text{Recall}}{\beta^2 \cdot \text{Precision} + \text{Recall}}$$

In the present disclosure, accuracy, a recall rate, and an F-Score of each model are shown in Table 3:

TABLE 3

| EFPN | DSE | DFF | Accuracy | Recall rate | F1-Score | F2-Score |
|---|---|---|---|---|---|---|
| ✓ | ✓ | ✓ | 0.9619 | 0.9469 | 0.9544 | 0.9499 |
| | | | 0.9610 | 0.9054 | 0.9324 | 0.9160 |
| ✓ | | | 0.9665 | 0.9369 | 0.9515 | 0.9427 |
| | ✓ | | 0.9545 | 0.9269 | 0.9405 | 0.9323 |
| | | ✓ | 0.9721 | 0.9088 | 0.9394 | 0.9208 |
| ✓ | ✓ | | 0.9554 | 0.9405 | 0.9479 | 0.9435 |
| ✓ | | ✓ | 0.9610 | 0.9341 | 0.9473 | 0.9393 |
| | ✓ | ✓ | 0.9619 | 0.9358 | 0.9487 | 0.9409 |

In order to check all defects of the transmission line as much as possible and avoid a potential power failure risk, the F2-Score, which has a higher recall rate and more tends to check all potential risks as much as possible, is taken as the evaluation indicator. The DSE-based enhanced feature pyramid classification network proposed in the present disclosure can better find more potential risks.

Experimental results of data augmentation and defect elimination in the step 2) and the step 3) of the present disclosure are shown in Table 4:

TABLE 4

| Model | Accuracy | Accuracy of the normal set | Accuracy of the defect set |
|---|---|---|---|
| ResNet34 | 0.8801 (+0.0000) | 0.9545 (+0.0000) | 0.6507 (+0.0000) |
| ResNet34 + data augmentation | 0.8947 (+0.0146) | 0.9610 (+0.0065) | 0.6905 (+0.0398) |
| DSE enhancement of the DSE-based enhanced feature pyramid classification network | 0.9228 (+0.0427) | 0.9610 (+0.0065) | 0.7991 (+0.1484) |
| Feature pyramid classification network + data augmentation | 0.9305 (+0.0504) | 0.9619 (+0.0074) | 0.8338 (+0.1831) |

It can be seen from Table 4 that the data augmentation method can improve the accuracy of the defect set more effectively, because the data augmentation method decouples more background factors from the identified target, and improves a defect set with low classification accuracy.

The foregoing embodiments are only used to explain the technical solutions of the present disclosure, and are not intended to limit the same. Although the present disclosure is described in detail with reference to the foregoing embodiments, those of ordinary skill in the art should understand that they can still modify the technical solutions described in the foregoing embodiments, or make equivalent substitutions on some technical features therein. These modifications or substitutions do not make the essence of the corresponding technical solutions deviate from the spirit and scope of the technical solutions of the embodiments of the present disclosure. The present disclosure is not limited to the above-mentioned optional implementations, and anyone can derive other products in various forms under the enlightenment of the present disclosure. The above-mentioned specific implementations should not be construed as limiting the protection scope of the present disclosure, and the protection scope of the present disclosure should be defined by the claims. Moreover, the description can be used to interpret the claims.

The preferred embodiments of the present disclosure disclosed above are only used to help illustrate the present disclosure. The preferred embodiments neither describe all the details in detail, nor limit the present disclosure to the specific implementations described. Obviously, many modifications and changes may be made based on the content of the present specification. In the present specification, these embodiments are selected and specifically described to better explain the principle and practical application of the present disclosure, so that a person skilled in the art can well understand and use the present disclosure. The present disclosure is only limited by the claims and a full scope and equivalents thereof.

What is claimed is:

1. A transmission line defect identification method based on a saliency map and a semantic-embedded feature pyramid, the method comprising the following steps:
   1) taking a target image of a transmission line as a dataset, labeling, based on whether the transmission line has a defect, the dataset as a normal set or a defect set, and classifying the dataset as a small target set or a non-small target set based on a size of the target image and a given threshold;
   2) performing image super-resolution expansion on the small target set by using an Electric Line-Enhanced Super-Resolution Generative Adversarial Network (EL-ESRGAN) algorithm, combining the non-small target set and the small target set obtained after image super-resolution expansion, compressing a combined set based on a size of the small target set, and dividing the combined set into a training set and a test set;
   3) generating the saliency map of an image in the training set by using a nested saliency detection network ($U^2$-Net), ensuring integrity of a key region of a detection target by using a morphological expansion algorithm, generating a cutout region randomly for a part whose saliency score is less than a threshold, and padding a pixel randomly to form a data-augmented image set;
   4) inputting a data-augmented image and its label into a deep semantic embedding (DSE)-based feature pyramid classification network to perform training to obtain a trained classifier; and
   5) obtaining image data of an inspected target of the transmission line in real time, and taking the image data as an input of the trained classifier to output an identification result,
   wherein performing the image super-resolution expansion on the small target further comprises:
      defining loss functions of a generator and a discriminator of an EL-ESRGAN model, wherein formulas of the loss functions are as follows:

$$L_G^{Ra} = -E_{x_r}[\log(1-D_{Ra}(x_r,x_f))] - E_{x_f}[\log(D_{Ra}(x_f,x_r))]$$

$$L_D^{Ra} = -E_{x_r}[\log(D_{Ra}(x_r,x_f))] - E_{x_f}[\log(1-D_{Ra}(x_f,x_r))]$$

wherein $L_G^{Ra}$ represents a GAN loss function of the generator, $L_D^{Ra}$ represents a GAN loss function of the discriminator, $D_{Ra}(x_r,x_f)$ represents a probability that an authenticated image is more real than a false image, $D_{Ra}(x_f,x_r)$ represents a probability that the authenticated image is falser than a real image, $E_{x_f}[\ ]$ represents an averaging operation performed on all false data in a processing batch, $x_i$ represents a low-resolution image input into a GAN, $x_f$ represents an authenticated image that is generated by the GAN and determined to be false, and $x_r$ represents an authenticated image that is generated by the GAN and determined to be real;
   training the generator of the EL-ESRGAN model by using the non-small target set of the transmission line to obtain a second-order degradation model, and using an L1 loss function, a perceptual loss function, and the GAN loss functions represented by $L_G^{Ra}$ and $L_D^{Ra}$ together to construct an overall loss function of the EL-ESRGAN, and performing training to obtain the EL-ESRGAN model; and
   performing image super-resolution augmentation on the small target set of the transmission line by using the EL-ESRGAN model.

2. The according to claim 1, further comprising:
   building a residual U-block (RSU) network based on a residual block network structure;
   building, by stacking the RSU network, the $U^2$-Net composed of 11 stages;
   generating a saliency score of the target image of the transmission line by using the $U^2$-Net, ensuring integrity of the key region of the detection target by using the morphological expansion algorithm, and generating an image mask region; and randomly selecting GridMask and random cutout algorithms to perform a cutout operation randomly in the image mask region, and padding the pixel randomly.

3. The method according to claim 1, further comprising a DSE-based feature pyramid classification network comprising:
- a residual network (ResNet) feature extraction module, wherein an input of the ResNet feature extraction module is the target image of the transmission line, and an output of the ResNet feature extraction module is features of different scales of the image;
- an enhanced feature pyramid network (EFPN) module, wherein an input of the EFPN module is the features of the different scales that are generated by the ResNet feature extraction module, and an output of the EFPN module is a feature obtained by fusing features of adjacent scales;
- a DSE module, where an input of the DSE module is the fused feature generated by the EFPN module, and an output of the DSE module is a low-resolution feature with rich semantic information and a high-resolution feature with rich position information;
- a deep feature fusion (DFF) module, wherein an input of the DFF module is the low-resolution feature and the high-resolution feature generated by the DSE module, and an output of the DFF module is a feature vector obtained by performing convolution and pooling operations on the high-resolution feature and the low-resolution feature; and
- an image object classification network (OC), wherein an input of the OC is the feature vector generated by the DFF module for the high-resolution feature and the low-resolution feature, and an output of the OC is a classification result indicating whether the inspected target of the transmission line is faulty.

4. The according to claim 1, wherein the dataset is an insulator self-explosion dataset of the transmission line.

* * * * *